United States Patent
Nakada et al.

(10) Patent No.: US 10,677,128 B2
(45) Date of Patent: Jun. 9, 2020

(54) EXHAUST PURIFICATION SYSTEM AND CATALYST REGENERATION METHOD

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP); Hiroyuki Yuza, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 68 days.

(21) Appl. No.: 15/555,286

(22) PCT Filed: Feb. 25, 2016

(86) PCT No.: PCT/JP2016/055640
§ 371 (c)(1),
(2) Date: Sep. 1, 2017

(87) PCT Pub. No.: WO2016/140138
PCT Pub. Date: Sep. 9, 2016

(65) Prior Publication Data
US 2018/0058290 A1 Mar. 1, 2018

(30) Foreign Application Priority Data

Mar. 4, 2015 (JP) ................................. 2015-042668

(51) Int. Cl.
*F01N 3/20* (2006.01)
*F01N 9/00* (2006.01)
*F01N 3/08* (2006.01)

(52) U.S. Cl.
CPC ........... *F01N 3/206* (2013.01); *F01N 3/0814* (2013.01); *F01N 3/0842* (2013.01);
(Continued)

(58) Field of Classification Search
CPC ......... F01N 2610/03; F01N 2900/1402; F01N 2900/1411; F01N 2900/1602;
(Continued)

(56) References Cited

U.S. PATENT DOCUMENTS

| 5,715,679 A * | 2/1998 | Asanuma ........... B01D 53/9481 60/276 |
| 2005/0014978 A1 * | 1/2005 | Nagaoka .................. B01J 38/02 568/662 |

(Continued)

FOREIGN PATENT DOCUMENTS

| CN | 101405488 A | 4/2009 |
| EP | 1547668 A1 | 6/2005 |

(Continued)

OTHER PUBLICATIONS

Extended European Search Report for related EP App No. 167588316 dated Jun. 28, 2018, 7 pgs.

(Continued)

*Primary Examiner* — Matthew T Largi
(74) *Attorney, Agent, or Firm* — Procopio, Cory, Hargreaves & Savitch LLP

(57) ABSTRACT

Provided is an exhaust purification system including: an NOx occlusion reduction type catalyst that is provided in an exhaust system of an internal combustion engine, and occludes NOx when an exhaust gas is in a lean state, and reduces the NOx when the exhaust gas is in a rich state; a regeneration control unit that executes a regeneration process of bringing the exhaust gas into a rich state to reduce the NOx occluded in the NOx occlusion reduction type catalyst; a storing unit that stores an exhaust lambda prediction value in advance when the regeneration process is executed; a reduction amount estimating unit that estimates an NOx reduction amount when the regeneration process is executed; and a prohibition unit that prohibits the execution (Continued)

of the regeneration process by the regeneration control unit when the estimated NOx reduction amount is less than a predetermined lower limit threshold.

3 Claims, 8 Drawing Sheets

(52) U.S. Cl.
CPC ............ *F01N 3/0871* (2013.01); *F01N 9/002* (2013.01); *F01N 2610/03* (2013.01); *F01N 2900/1402* (2013.01); *F01N 2900/1602* (2013.01)

(58) Field of Classification Search
CPC ..... F01N 2900/1614; F01N 2900/1621; F01N 3/0814; F01N 3/0842; F01N 3/0871; F01N 3/206; F01N 9/00; F01N 9/002
See application file for complete search history.

(56) References Cited

U.S. PATENT DOCUMENTS

| | | | | |
|---|---|---|---|---|
| 2007/0022742 | A1* | 2/2007 | Nagaoka | B01D 53/9431 60/285 |
| 2008/0276602 | A1* | 11/2008 | McCabe | F01N 3/0821 60/295 |
| 2009/0031709 | A1 | 2/2009 | Yoshida et al. | |
| 2009/0156358 | A1* | 6/2009 | Shamis | F01N 3/0842 477/100 |
| 2011/0041479 | A1* | 2/2011 | Nagaoka | B01D 53/9477 60/286 |

FOREIGN PATENT DOCUMENTS

| | | | | |
|---|---|---|---|---|
| EP | 2826970 A1 * | 1/2015 | ........... | F01N 3/2046 |
| EP | 2826970 A1 | 1/2015 | | |
| JP | 2002-266629 A | 9/2002 | | |
| JP | 2003-184545 A | 7/2003 | | |
| JP | 2004068694 A | 3/2004 | | |
| JP | 2005-291098 A | 10/2005 | | |
| JP | 2008-202425 A | 9/2008 | | |
| JP | 2014-066232 A | 4/2014 | | |

OTHER PUBLICATIONS

International Search Report and Written Opinion for PCT App No. PCT/JP2016/055640 dated May 31, 2016, 7 pgs.
First Office Action for related CN App No. 201680013169.8 dated Jan. 31, 2019, 13 pgs.

\* cited by examiner

EXHAUST PURIFICATION SYSTEM AND CATALYST REGENERATION METHOD

CROSS-REFERENCE TO RELATED APPLICATIONS

This application is a U.S. National Stage entry of PCT Application No. PCT/JP2016/055640, filed on Feb. 25, 2016, which claims priority to Japanese Patent Application No. 2015-042668, filed Mar. 4, 2015, the contents of which are incorporated herein by reference.

TECHNICAL FIELD

The present invention relates to an exhaust purification system and a catalyst regeneration method.

BACKGROUND ART

In the related art, an NOx occlusion reduction type catalyst is known as a catalyst which reduces and purifies a nitrogen compound (NOx) in an exhaust gas discharged from an internal combustion engine. When the exhaust gas is under a lean atmosphere, the NOx occlusion reduction type catalyst occludes the NOx contained in the exhaust gas. When the exhaust gas is under a rich atmosphere, the NOx occlusion reduction type catalyst detoxifies the occluded NOx through reducing and purifying with hydrocarbon contained in the exhaust gas, and discharges the NOx. For this reason, in a case where the NOx occlusion amount of the catalyst reaches a predetermined amount, in order to recover NOx occlusion capacity, it is necessary to regularly perform the so-called NOx purge which makes the exhaust gas be in a rich state by a post injection or an exhaust pipe injection (for example, see JP-A-2008-202425).

In addition, there is proposed a technique for calculating, based on an output of a sensor disposed downstream of an NOx absorbent, at least one of the maximum amount of NOx absorption of the NOx absorbent and an NOx absorption rate in the NOx absorbent and for determining that the NOx absorbent has deteriorated when the calculated maximum amount of NOx absorption or the NOx absorption rate is smaller than the determination value (for example, see JP-A-2002-266629).

SUMMARY OF THE INVENTION

Technical Problem

Meanwhile, even when the NOx purge is performed in a state where the temperature of the NOx occlusion reduction type catalyst is lower than the activation temperature, for example, a desired NOx reduction amount cannot be obtained in some cases. When the NOx purge is performed in such a state that the NOx reduction amount cannot be expected, there is a problem that fuel consumed by post injection or exhaust pipe injection is wasted, resulting in causing deterioration of fuel consumption.

An object of the exhaust purification system and the catalyst regeneration method of the present disclosure is to effectively suppress useless execution of NOx purge, thereby preventing deterioration of fuel consumption.

Solution to Problem

An exhaust purification system according to the disclosure includes: an NOx occlusion reduction type catalyst that is provided in an exhaust passage of an internal combustion engine and, when an exhaust gas is in a lean state, occludes NOx contained in the exhaust gas and, when the exhaust gas is in a rich state, reduces and purifies the occluded NOx; a catalyst regeneration unit that executes a catalyst regeneration process of bringing the exhaust gas into a rich state to reduce and purify the NOx occluded in the NOx occlusion reduction type catalyst; a reduction amount estimating unit that estimates an NOx reduction amount predicted at the time of executing the catalyst regeneration process before staring the catalyst regeneration process using the catalyst regeneration unit; and a prohibition unit that prohibits the execution of the catalyst regeneration process by the catalyst regeneration unit when the NOx reduction amount estimated by the reduction amount estimating unit is less than a predetermined lower limit threshold.

In addition, an exhaust purification system according to the disclosure includes: an NOx occlusion reduction type catalyst that is disposed in an exhaust passage of an internal combustion engine, and occludes and reduce a nitrogen compound contained an exhaust gas discharged from the internal combustion engine; and a control unit that controls an air-fuel ratio of the exhaust gas discharged from the internal combustion engine, wherein the control unit operates to execute a series of process including:

a catalyst regeneration process of bringing the exhaust gas into a rich state to reduce and purify NOx occluded in the NOx occlusion reduction type catalyst;

a reduction amount estimating process of estimating an NOx reduction amount predicted at the time of executing the catalyst regeneration process before execution of the catalyst regeneration process; and a prohibition process of prohibiting the execution of the catalyst regeneration process when the NOx reduction amount estimated by the reduction amount estimating process is less than a lower limit threshold.

In an exhaust purification system including an NOx occlusion reduction type catalyst that is disposed in an exhaust passage of an internal combustion engine, and occludes and reduce a nitrogen compound contained an exhaust gas discharged from the internal combustion engine, a catalyst regeneration method according to the disclosure includes: a catalyst regeneration process of bringing the exhaust gas into a rich state to reduce and purify NOx occluded in the NOx occlusion reduction type catalyst; a reduction amount estimating process of estimating an NOx reduction amount predicted at the time of executing the catalyst regeneration process before execution of the catalyst regeneration process; and a prohibition process of prohibiting the execution of the catalyst regeneration process when the NOx reduction amount estimated by the reduction amount estimating process is less than a lower limit threshold.

Advantageous Effects of the Invention

According to the exhaust purification system and the catalyst regeneration method of the present disclosure, it is possible to effectively suppress useless execution of NOx purge, thereby preventing deterioration of fuel consumption.

DESCRIPTION OF EMBODIMENTS

Hereinafter, an exhaust purification system according to one embodiment of the present invention will be described based on accompanying drawings.

Figure 1:
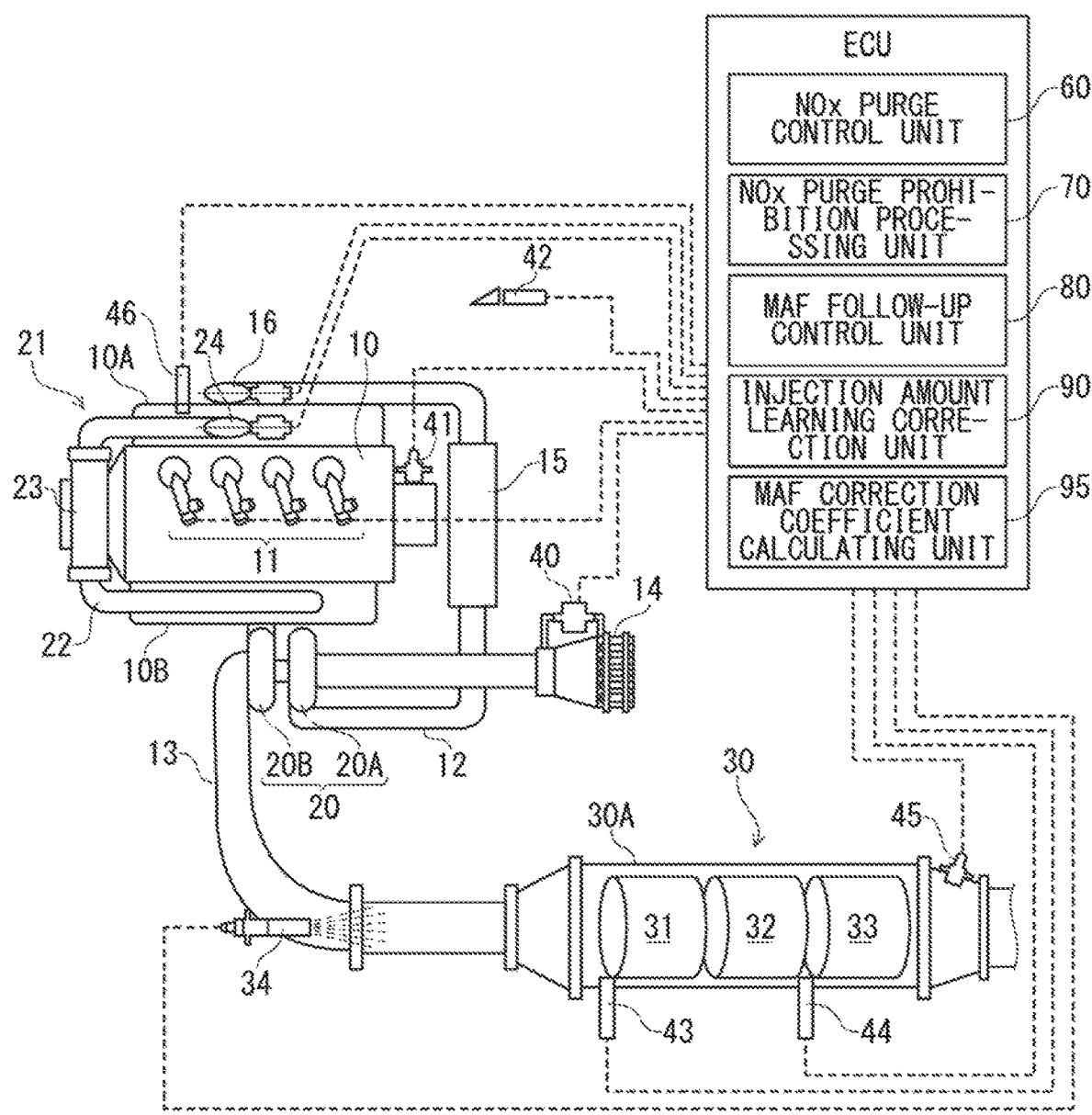
FIG. 1 is an entire configuration diagram illustrating an exhaust purification system according to this embodiment.

As illustrated in FIG. 1, an injector 11 which directly injects high pressure fuel accumulated in a common rail (not illustrated) into a cylinder is provided in each of cylinders of a diesel engine (hereinafter, simply referred to as an engine) 10. The fuel injection amount or the fuel injection timing of the injector 11 is controlled in response to an instruction signal input from an electronic control unit (hereinafter, referred to as ECU) 50.

An intake manifold 10A of the engine 10 is connected with an intake passage 12 which introduces fresh air therein, and an exhaust manifold 10B is connected with an exhaust passage 13 which derives an exhaust gas outside. An air cleaner 14, an intake air amount sensor (hereinafter, referred to as a MAF sensor) 40, a compressor 20A of a variable capacity supercharger 20, an intercooler 15, an intake throttle valve 16, and the like are provided in order from an intake upstream side in the intake passage 12. A turbine 20B of the variable capacity supercharger 20, an exhaust post-treatment device 30, and the like are provided in order from an exhaust upstream side in the exhaust passage 13. The engine 10 is attached with an engine speed sensor 41, an accelerator opening sensor 42, and a boost pressure sensor 46.

In the description of this embodiment, an MAF sensor 40 for measuring and detecting the mass air flow is used as the intake air amount sensor for measuring and detecting the intake air amount (suction air flow) of the engine, but a different type of air flow sensor from the MAF sensor 40 or a unit substituted for the air flow sensor may be used as long as it can measure and detect the suction air flow of the engine.

An EGR (Exhaust Gas Recirculation) device 21 includes an EGR passage 22 which connects the exhaust manifold 10B and the intake manifold 10A, an EGR cooler 23 which cools an EGR gas, and an EGR valve 24 which adjusts an EGR amount.

The exhaust post-treatment device 30 is configured such that an oxidation catalyst 31, an NOx occlusion reduction type catalyst 32, and a particulate filter (hereinafter, simply referred to as a filter) 33 are disposed in order from the exhaust upstream side in a case 30A. An exhaust pipe injection device 34 which injects an unburned fuel (mainly, HC) into the exhaust passage 13 in response to the instruction signal input from an ECU 50 is provided in the exhaust passage 13 on the upstream side from the oxidation catalyst 31.

For example, the oxidation catalyst 31 is formed by carrying an oxidation catalyst component on a ceramic carrier surface such as a honeycomb structure. When an unburned fuel is supplied by the post injection of the exhaust pipe injection device 34 or the injector 11, the oxidation catalyst 31 oxidizes the unburned fuel to raise the exhaust temperature.

For example, the NOx occlusion reduction type catalyst 32 is formed by carrying an alkali metal and the like on a ceramic carrier surface such as a honeycomb structure. The NOx occlusion reduction type catalyst 32 occludes NOx in the exhaust gas when an exhaust air fuel ratio is in a lean state, and reduces and eliminates the occluded NOx by a reducing agent (HC and the like) contained in the exhaust gas when the exhaust air fuel ratio is in a rich state.

For example, the filter 33 is formed such that a plurality of cells sectioned by porous partition walls are disposed in a flowing direction of the exhaust gas, and the upstream side and the downstream side of the cells are sealed alternately. In the filter 33, PM in the exhaust gas is collected in a pore or a surface of the partition wall, and when the estimation amount of PM deposition reaches a predetermined amount, the so-called filter-forced regeneration is performed which combusts and removes the PM. The filter-forced regeneration is performed in such a manner that the unburned fuel is supplied to the oxidation catalyst 31 on the upstream side by an exhaust pipe injection or the post injection, and the temperature of the exhaust gas flowing in the filter 33 is raised to a PM combusting temperature.

A first exhaust temperature sensor 43 is provided on the upstream side from the oxidation catalyst 31, and detects the temperature of the exhaust gas flowing in the oxidation catalyst 31. A second exhaust temperature sensor 44 is provided between the oxidation catalyst 31 and the NOx occlusion reduction type catalyst 32, and detects the temperature of the exhaust gas flowing in the NOx occlusion reduction type catalyst 32. An NOx/lambda sensor 45 is provided on the downstream side from the filter 33, and detects an NOx value and a lambda value of the exhaust gas passing through the NOx occlusion reduction type catalyst 32 (hereinafter, referred to as an excess air ratio).

The ECU 50 performs various controls on the engine 10 and the like, and includes a well-known CPU or a ROM, a RAM, an input port, an output port, and the like. In order to perform the various controls, the sensor values of the sensors 40 to 46 are input to the ECU 50. The ECU 50 includes a NOx purge control unit 60, a NOx purge prohibition processing unit 70, a MAF follow-up control unit 80, an injection amount learning correction unit 90, and a MAF correction coefficient calculating unit 95 as partial functional elements. In description, such functional elements are included in the ECU 50 which is an integral hardware. However, any part thereof may be provided in a separate hardware.

[NOx Purge Control]

The NOx purge control unit 60 is an example of the catalyst regeneration unit of the present disclosure, and executes a control (hereinafter, referred to as an NOx purge control) that recovers the NOx occlusion capacity of the NOx occlusion reduction type catalyst 32 by detoxifying the NOx, which is occluded in the NOx occlusion reduction type catalyst 32 when the exhaust gas is under a rich atmosphere, by reduction purification, and then discharging the NOx.

The "start request" of the NOx purge control is established, for example, when an NOx discharging amount per unit of time is estimated from the operating state of the engine 10 and an estimated accumulated value ΣNOx calculated by accumulating the NOx discharging amounts exceeds the predetermined threshold, alternatively, when an NOx purification rate of the NOx occlusion reduction type catalyst 32 is calculated from the NOx discharging amount on the catalyst upstream side estimated from the operating state of the engine 10, an NOx amount on the catalyst downstream side detected by the NOx/lambda sensor 45, and the NOx purification rate is lower than the predetermined determination threshold. The NOx purge flag $F_{NP}$, which executes the NOx purge control, is turned on ($F_{NP}$=1) (see time $t_1$ of FIG. 2) when the "start request" is established and the prohibition flag $F_{Pro\_NP}$ (the details will be described below) is turned off.

In this embodiment, the exhaust gas is made rich using the NOx purge control, for example, in a such a manner that the NOx purge lean control that lowers the excess air ratio by an air-system control from a steady operating state (for example, about 1.5) to a first target excess air ratio (for example, about 1.3) on a lean side from a value equivalent to a theoretical air-fuel ratio (about 1.0), and the NOx purge rich control that lowers the excess air ratio by the injection system control from the first target excess air ratio to a second target excess air ratio on a rich side (for example, about 0.9) are used in combination. Hereinafter, a detail description will be given about the NOx purge lean control and the NOx purge rich control.

<MAF Target Value Setting of NOx Purge Lean Control>

Figure 3:
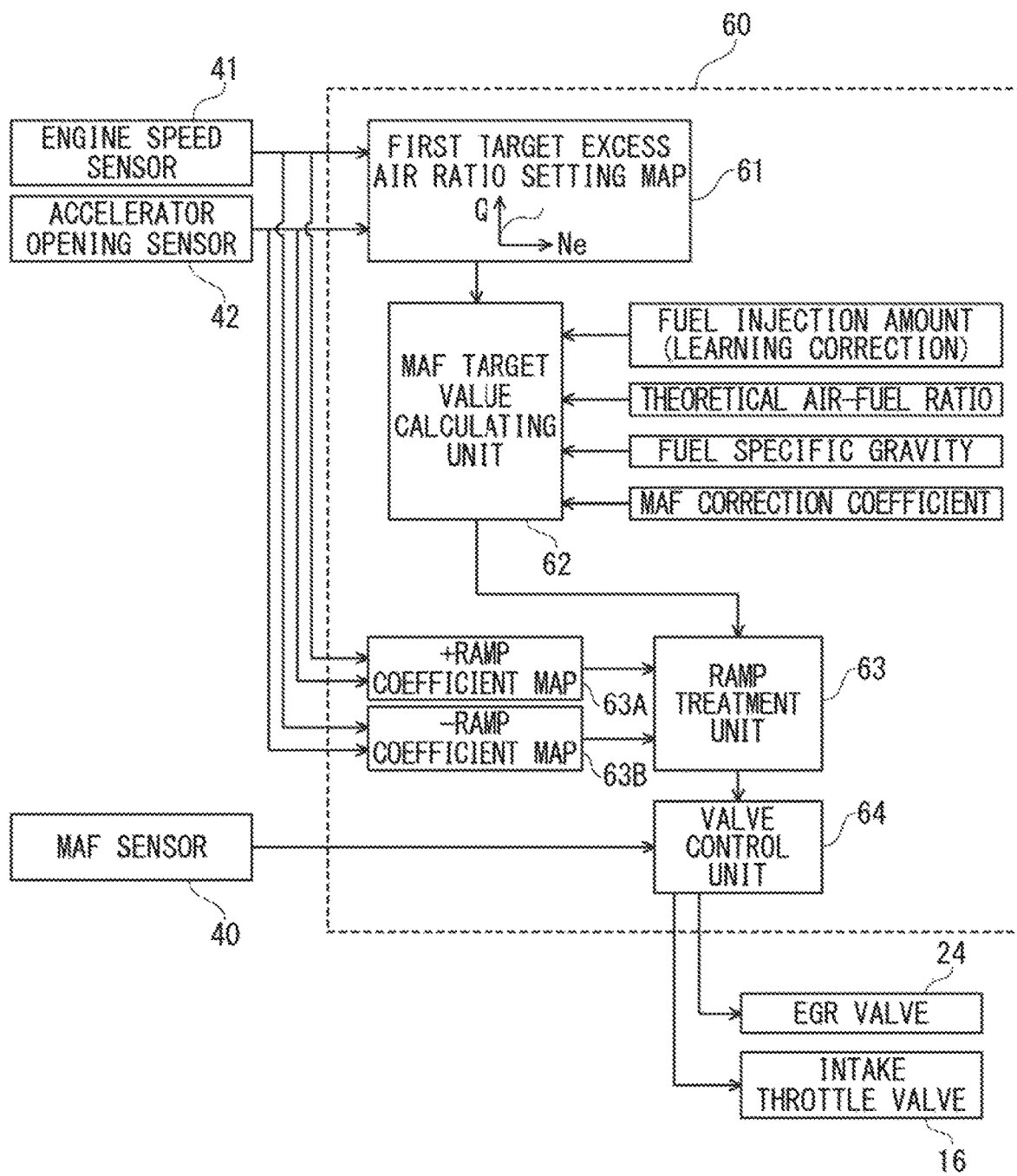
FIG. 3 is a block diagram illustrating a setting process of a $MA_F$ target value at the time of an NOx purge lean control according to this embodiment.

FIG. 3 is a block diagram illustrating a setting process of the MAF target value $MAF_{NPL\_Trgt}$ at the time of the NOx purge lean control. The third target excess air ratio setting map 61 is a map based on the engine speed Ne and the accelerator opening Q. The excess air ratio target value $\lambda_{NPL\_Trgt}$ at the time of the NOx purge lean control corresponding to the engine speed Ne and the accelerator opening Q is set based on an experiment and the like in advance.

First, the excess air ratio target value $\lambda_{NPL\_Trgt}$ at the time of the NOx purge lean control is read from the first target excess air ratio setting map 61 using the engine speed Ne and the accelerator opening Q as input signals, and is input to the MAF target value calculating unit 62. In addition, in the MAF target value calculating unit 62, the MAF target value $MAF_{NPL\_Trgt}$ at time of the NOx purge lean control is calculated based on the following Equation (1).

$$MAF_{NPL\_Trgt} = \lambda_{NPL\_Trgt} \times Q_{fnl\_corrd} \times Ro_{Fuel} \times AFR_{sto}/Maf\_corr \quad (1)$$

In Equation (1), $Q_{fnl\_corrd}$ indicates a learning-corrected (to be described later) fuel injection amount (excluding the post injection). $Ro_{Fuel}$ indicates a fuel specific gravity, $AFR_{sto}$ indicates a theoretical air-fuel ratio, and $Maf\_corr$ indicates a MAF correction coefficient (to be described later).

Figure 2:
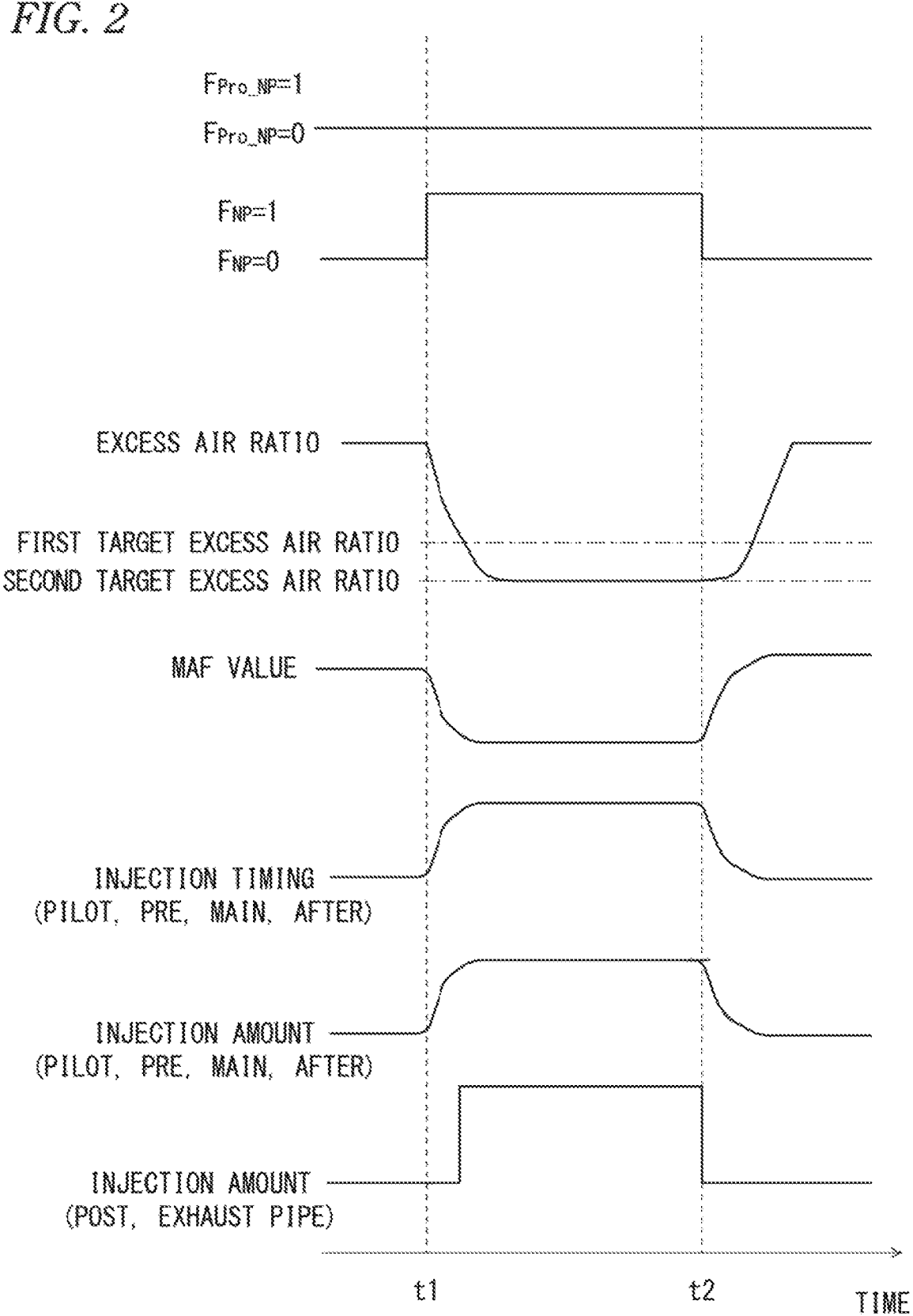
FIG. 2 is a timing chart for describing an NOx purge control according to this embodiment.

The MAF target value $MAF_{NPL\_Trgt}$ calculated by the MAF target value calculating unit 62 is input to a ramp treatment unit 63 when the NOx purge flag $F_{NP}$ is turned on (see time $t_1$ of FIG. 2). The ramp treatment unit 63 reads a ramp coefficient from a plus ramp coefficient map 63A and a minus ramp coefficient 63B using the engine speed Ne and the accelerator opening Q as input signals, and inputs a MAF target ramp value $MAF_{NPL\_Trgt\_Ramp}$, in which the ramp coefficient is added, to a valve control unit 64.

The valve control unit 64 executes a feedback control that throttles the intake throttle valve 16 to the shutting side and opens the EGR valve 24 to the open side such that the actual MAF value $MAF_{Act}$ input from the MAF sensor 40 becomes the MAF target ramp value $MAF_{NPL\_Trgt\_Ramp}$.

In this manner, in this embodiment, the MAF target value $MAF_{NPL\_Trgt}$ is set based on the excess air ratio target value $\lambda_{NPL\_Trgt}$ read from the first target excess air ratio setting map 61 and the fuel injection amount of the injector 11, and an air system operation is feedback-controlled based on the MAF target value $MAF_{NPL\_Trgt}$. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the NOx purge lean control.

When the fuel injection amount $Q_{fnl\_corrd}$ after the learning correction is used as the fuel injection amount of the injector 11, the MAF target value $MAF_{NPL\_Trgt}$ can be set by a feed-forward control to effectively exclude influence such as the aged deterioration, the property change, or the like of the injector 11.

When the ramp coefficient set in response to the operating state of the engine 10 is added to the MAF target value $MAF_{NPL\_Trgt}$, the deterioration of the drivability and the like caused by the misfire or the torque fluctuation of the engine 10 due to the rapid change of the intake air amount can be effectively prevented.

<Fuel Injection Amount Setting of NOx Purge Rich Control>

Figure 4:
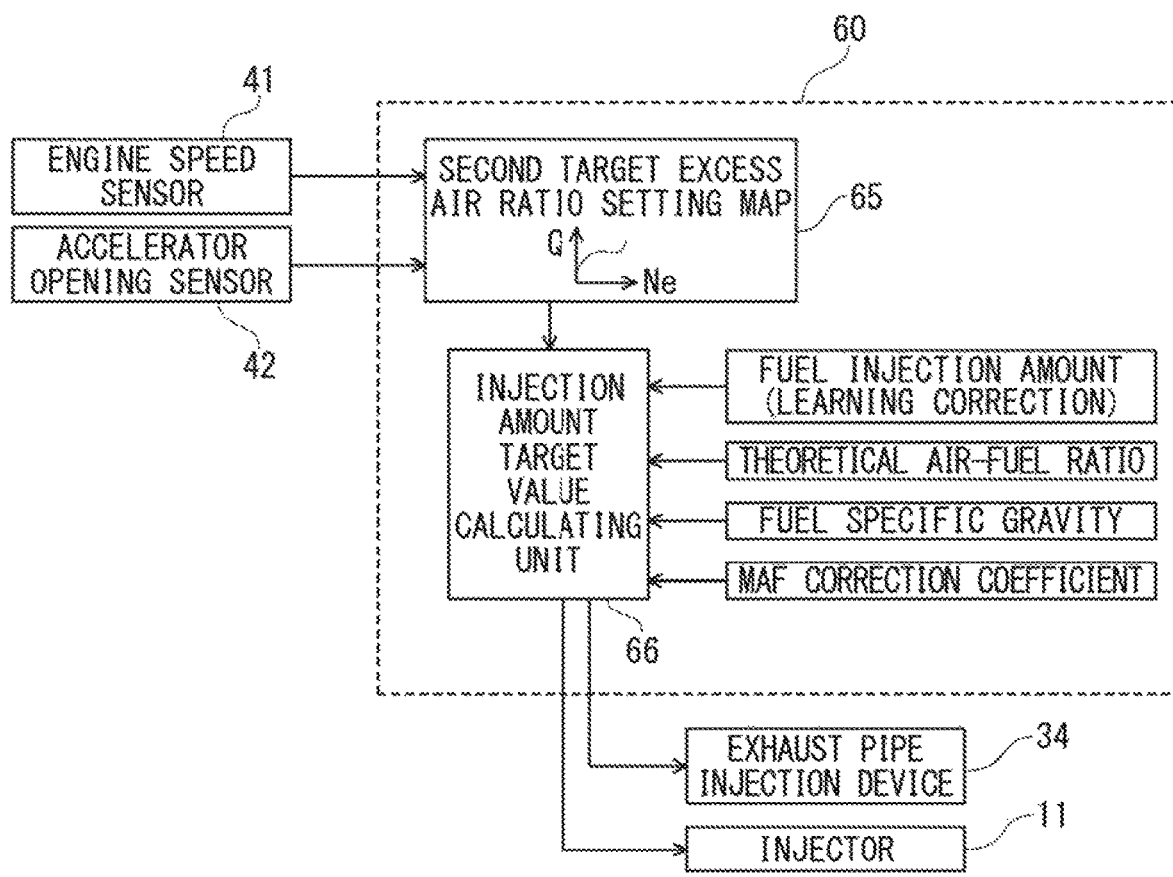
FIG. 4 is a block diagram illustrating a setting process of a target injection amount at the time of an NOx purge rich control according to this embodiment.

FIG. 4 is a block diagram illustrating a setting process of the target injection amount $Q_{NPR\_Trgt}$ (injection amount per unit of time) of the exhaust pipe injection or the post injection in the NOx purge rich control. A second target excess air ratio setting map 65 is a map based on the engine speed Ne and the accelerator opening Q. The excess air ratio target value $\lambda_{NPR\_Trgt}$ at the time of the NOx purge rich control corresponding to the engine speed Ne and the accelerator opening Q is set based on an experiment and the like in advance.

First, the excess air ratio target value $\lambda_{NPR\_Trgt}$ at the time of the NOx purge rich control is read from the second target excess air ratio setting map 65 using the engine speed Ne and the accelerator opening Q as input signals, and is input to an injection amount target value calculating unit 66. In addition, in the injection amount target value calculating unit 66, the target injection amount $Q_{NPR\_Trgt}$ at the time of the NOx purge rich control is calculated based on the following Equation (2).

$$Q_{NPR\_Trgt} = MAF_{NPL\_Trgt} \times Maf\_corr/(\lambda_{NPR\_Target} \times Ro_{Fuel} \times AFR_{sto}) - Q_{fnl\_corrd} \quad (2)$$

In Equation (2), $MAF_{NPL\_Trgt}$ is a MAF target value at the time of a lean NOx purge, and is input from the above-described MAF target value calculating unit 62. $Q_{fnl\_corrd}$ indicates a learning-corrected (to be described later) fuel injection amount (excluding the post injection) before a MAF follow-up control is applied thereto, $Ro_{Fuel}$ indicates a fuel specific gravity, and $AFR_{sto}$ indicates a theoretical air-fuel ratio, and $Maf\_corr$ indicates a MAF correction coefficient (to be described later).

When the NOx purge flag $F_{NP}$ is turned on, the target injection amount $Q_{NPR\_Trgt}$ calculated by the injection amount target value calculating unit 66 is transmitted as the injection instruction signal to the exhaust pipe injection device 34 or the injector 11 (time $t_1$ of FIG. 2). The transmission of the injection instruction signal is continued until the NOx purge flag $F_{NP}$ is turned off (time $t_2$ of FIG. 2) by the termination determination of the NOx purge control (to be described later).

In this manner, in this embodiment, the target injection amount $Q_{NPR\_Trgt}$ is set based on the excess air ratio target value $\lambda_{NPL\_Trgt}$ read from the second target excess air ratio setting map 65 and the fuel injection amount of the injector 11. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the NOx purge rich control.

When the fuel injection amount $Q_{fnl\_corrd}$ after the learning correction is used as the fuel injection amount of the injector 11, the target injection amount $Q_{NPR\_Trgt}$ can be set by the feed-forward control to effectively exclude influence such as the aged deterioration, the property change, or the like of the injector 11.

[Prohibition Process of NOx Purge Control]

Figure 5:
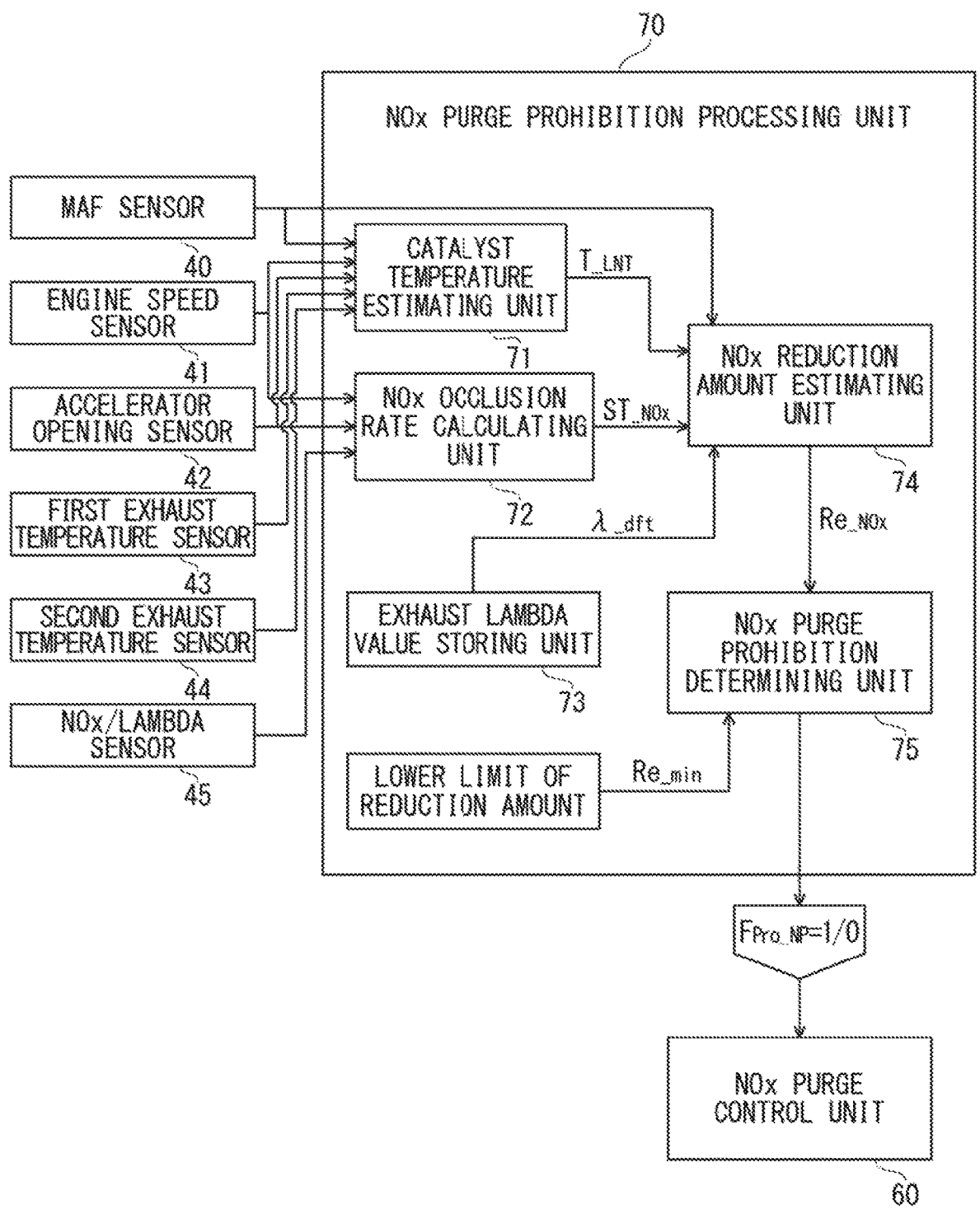
FIG. 5 is a block diagram illustrating a prohibition process of an NOx purge control according to this embodiment.

FIG. 5 is a block diagram illustrating a prohibition process of the NOx purge control executed by the NOx purge prohibition processing unit 70.

The NOx purge prohibition processing unit 70 includes an oxidation catalyst temperature estimating unit 71A, an NOx catalyst temperature estimating unit 71B, an NOx occlusion rate calculating unit 72, an exhaust lambda value storing unit 73, an NOx reduction amount estimating unit 74, and an NOx purge prohibition determining unit 75.

The oxidation catalyst temperature estimating unit 71A estimates an internal temperature (hereinafter, referred to as an oxidation catalyst temperature $T_{\_DOC}$) of the oxidation catalyst 31. In this embodiment, the oxidation catalyst temperature $T_{\_DOC}$ is estimated based on a model equation or a map including, for example, an inlet temperature of the oxidation catalyst detected by the first exhaust temperature sensor 43, an HC/CO calorific value inside the oxidation catalyst 31, and the amount of heat radiated to the outside air, as an input value.

The NOx catalyst temperature estimating unit 71B estimates an internal temperature (hereinafter, referred to as an NOx catalyst temperature $T_{\_LNT}$) of the NOx occlusion reduction type catalyst 32. In this embodiment, the NOx catalyst temperature $T_{\_LNT}$ is estimated based on a model equation or a map including, for example, an oxidation catalyst temperature $T_{\_DOC}$ (an inlet temperature of the NOx occlusion reduction type catalyst 32) input from the oxidation catalyst temperature estimating unit 71A, an HC/CO calorific value inside the NOx occlusion reduction type catalyst 32, and the amount of heat radiated to the outside air, as an input value.

The NOx occlusion rate calculating unit 72 estimates an NOx occlusion rate $ST_{\_NOx}$ of the NOx occlusion reduction type catalyst 32. The NOx occlusion rate $ST_{\_NOx}$ may be calculated based on, for example, an NOx value upstream of the NOx catalyst estimated from the operating state of the engine 10 and an NOx value downstream of the NOx catalyst detected by the NOx/lambda sensor 45.

The exhaust lambda value storing unit 73 stores an excess air ratio of the exhaust gas (hereinafter, referred to as an exhaust default lambda value $\lambda_{\_dflt}$) during the NOx purge rich control. The exhaust default lambda value $\lambda_{\_dflt}$ is obtained by experiment, simulation or the like for the excess air ratio of the exhaust gas on the upstream side of the NOx occlusion reduction type catalyst 32 in the case where the normal NOx purge rich control is executed, and is a fixed value less than 1 (for example, 0.9).

Upon executing the NOx purge control, the NOx reduction amount estimating/calculating unit 74 calculates the NOx amount (hereinafter, referred to as an estimated NOx reduction amount $Re_{\_NOx}$) that will be reduced by the NOx occlusion reduction type catalyst 32. In this embodiment, the calculation of the estimated NOx reduction amount $Re_{\_NOx}$ is preferably executed immediately before the start of the NOx purge control in which the NOx occlusion amount of the NOx occlusion reduction type catalyst 32 approaches a predetermined threshold. The estimated NOx reduction amount $Re_{\_NOx}$ is calculated based on a model equation or a map including, for example, the intake and exhaust air flow detected by the MAF sensor 40 or an exhaust air flow sensor (not illustrated), the catalyst temperature $T_{\_LNT}$ estimated by the catalyst temperature estimating unit 71, the NOx occlusion rate $ST_{\_NOx}$ calculated by the NOx occlusion efficiency calculating unit 72, and the exhaust default lambda value $\lambda_{\_dflt}$ stored in the exhaust lambda value storing unit 74 as an input value.

The NOx purge prohibition determining unit 75 determines based on the estimated NOx reduction amount $Re_{\_NOx}$ input from the NOx reduction amount calculating unit 74 whether or not to prohibit the execution of the NOx purge control. More specifically, when the estimated NOx reduction amount $Re_{\_NOx}$ is less than a predetermined lower limit reduction amount $Re_{\_Min}$ ($Re_{\_NOx}<Re_{\_Min}$), the NOx purge prohibition determining unit 75 determines that the execution of the NOx purge control should be prohibited, and sets the prohibition flag $F_{Pro\_NP}$ to be turned on ($F_{Pro\_NP}=1$). On the other hand, when the NOx reduction amount $Re_{\_NOx}$ is equal to or larger than the lower limit reduction amount $Re_{\_Min}$ ($Re_{\_NOx}\geq Re_{\_Min}$), the NOx purge prohibition determining unit 75 turns off the prohibition flag $F_{Pro\_NP}$ ($F_{Pro\_NP}=0$) so as to permit the execution of the NOx purge control. The lower limit reduction amount $Re_{\_NOx\_Min}$ used in these determinations may be set based on, for example, the NOx reduction amount corresponding to the fuel injection increase amount by the NOx purge rich control.

In this embodiment, as described above, the execution of the NOx purge control is prohibited when the estimated NOx reduction amount $Re_{\_NOx}$ expected at the time of the execution of the NOx purge control is less than the lower limit reduction amount $Re_{\_Min}$, and thus it is possible to prevent deterioration of fuel consumption caused by the useless NOx purge control.

<Termination Determination of NOx Purge Control>

When any condition of (1) a case where the injection amount of the exhaust pipe injection or the post injection is accumulated since the NOx purge flag $F_{NP}$ is turned on, and the cumulative injection amount reaches a predetermined upper limit threshold amount, (2) a case where the elapsed time timed from the start of the NOx purge control reaches the predetermined upper limit threshold time, and (3) a case where the NOx occlusion amount of the NOx occlusion reduction type catalyst 32 calculated based on a predetermined model equation including an operating state of the engine 10, a sensor value of the NOx/lambda sensor 45, or the like as input signals is reduced to a predetermined threshold indicating NOx removal success is satisfied, the NOx purge control is terminated by turning off the NOx purge flag $F_{NP}$ (see time $t_2$ of FIG. 2).

In this manner, in this embodiment, the upper limit of the cumulative injection amount and the elapsed time is set in the termination condition of the NOx purge control so that it can be reliably prevented that the fuel consumption amount is excessive in a case where the NOx purge does not succeed due to the lowering of the exhaust temperature and the like.

<MAF Follow-Up Control>

In (1) a time of switching from the lean state of a regular operation to the rich state through the SOx purge control or the NOx purge control, and (2) a time of switching the rich state to the lean state of the regular operation through the SOx purge control or the NOx purge control, the MAF follow-up control unit 80 executes a control to correct the fuel injection timing and the fuel injection amount of each injector 11 in response to a MAF change (hereinafter, referred to the control as a MAF follow-up control).

<Injection Amount Learning Correction>

Figure 6:
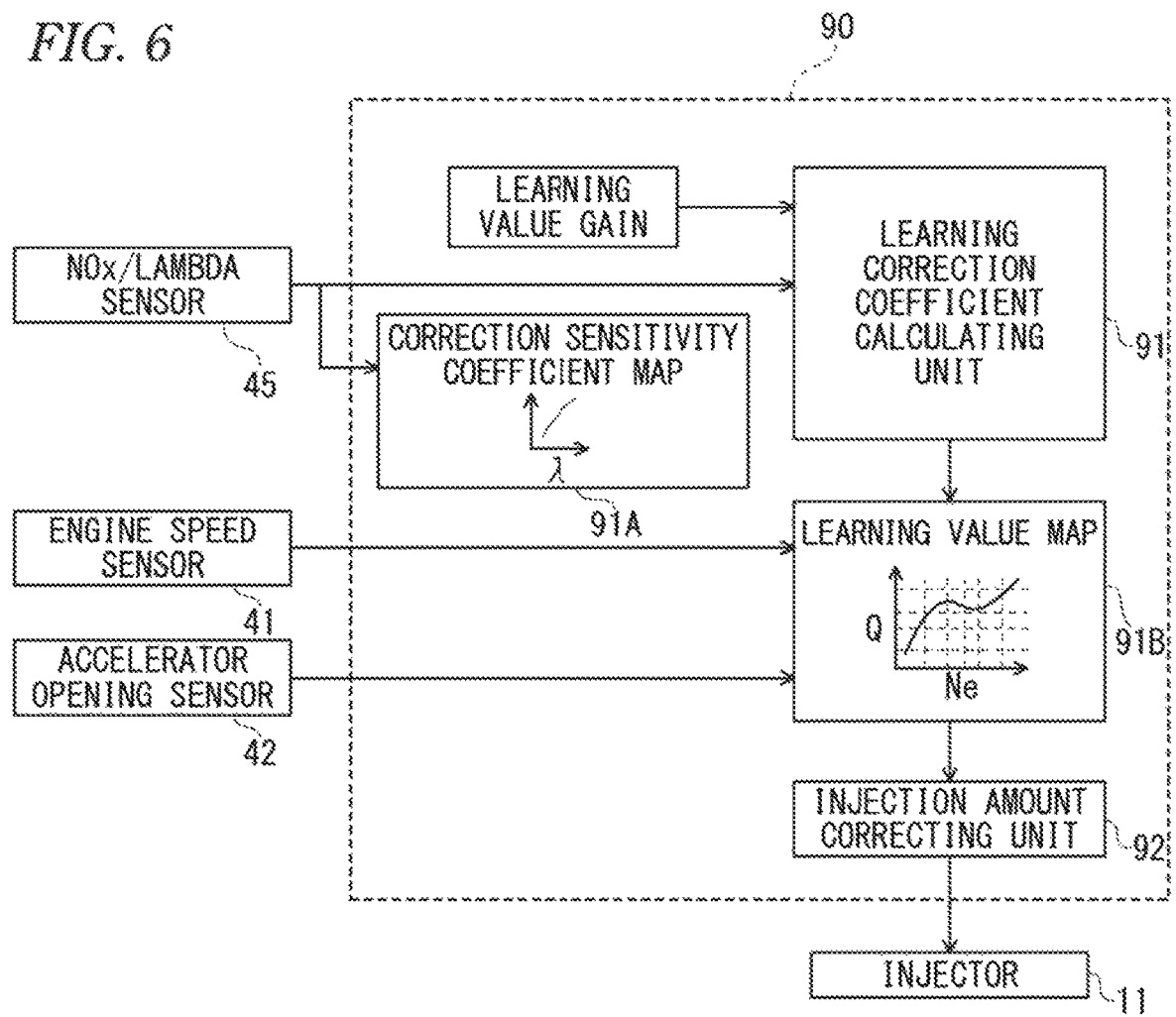
FIG. 6 is a block diagram illustrating a process of an injection amount learning correction of an injector according to this embodiment.

As illustrated in FIG. 6, the injection amount learning correction unit 90 includes a learning correction coefficient calculating unit 91 and an injection amount correcting unit 92.

Figure 7:
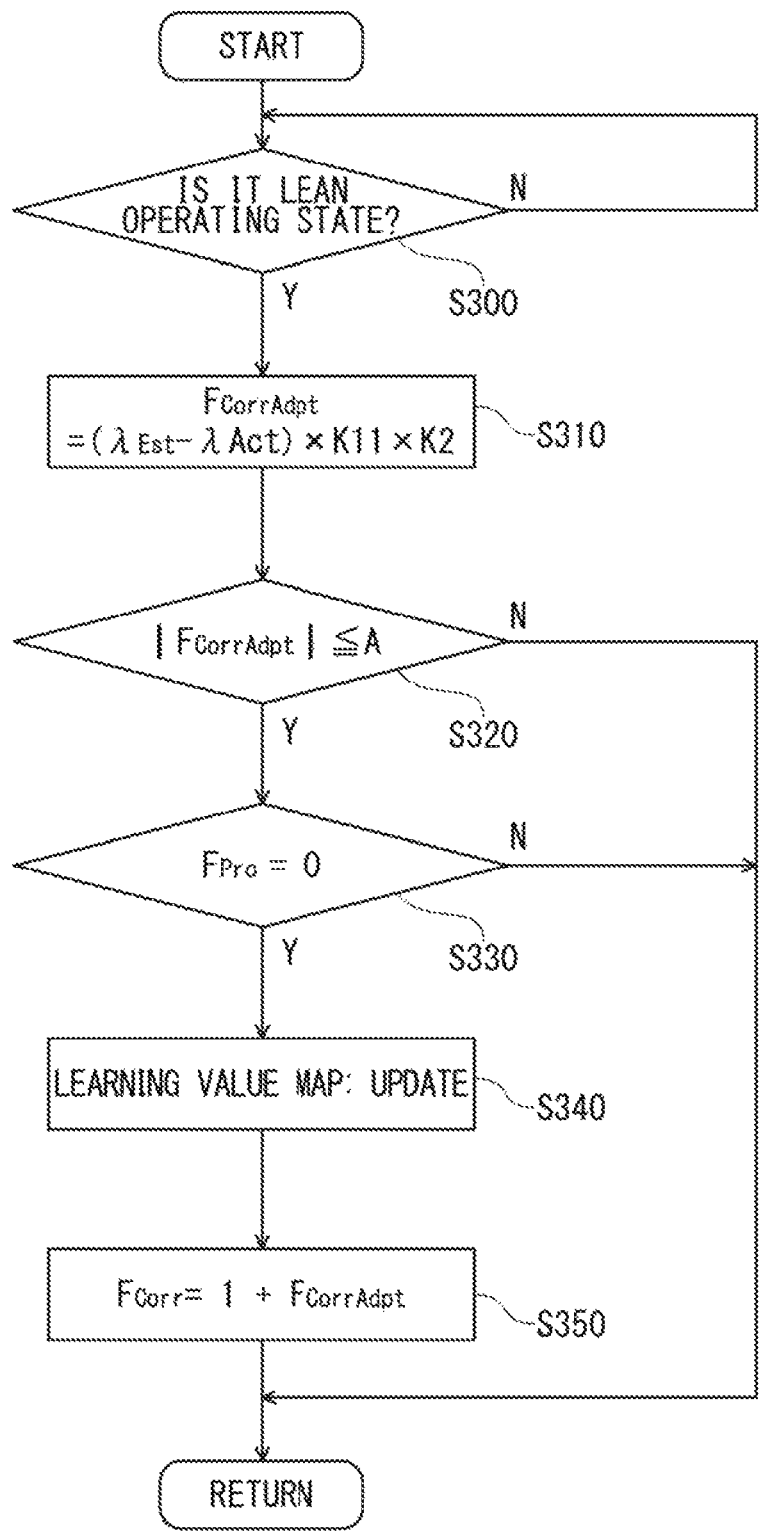
FIG. 7 is a flow diagram for describing a calculation process of a learning correction coefficient according to this embodiment.

The learning correction coefficient calculating unit 91 calculates a learning correction coefficient $F_{Corr}$ of the fuel injection amount based on an error $\Delta\lambda$ between an actual lambda value $\lambda_{Act}$ detected by the NOx/lambda sensor 45 at the time of a lean operation of the engine 10 and an estimated lambda value $\lambda_{Est}$. When the exhaust gas is in the lean state, the HC concentration in the exhaust gas is very low, so that the change in the exhaust lambda value due to the oxidation reaction of HC in the oxidation catalyst 31 is negligibly small. For this reason, it is considered that the actual lambda value $\lambda_{Act}$ in the exhaust gas which passes through the oxidation catalyst 31 and is detected by the NOx/lambda sensor 45 on the downstream side matches with the estimated lambda value $\lambda_{Est}$ in the exhaust gas discharged from the engine 10. For this reason, in a case where the error $\Delta\lambda$ occurs between the actual lambda value $\lambda_{Act}$ and the estimated lambda value $\lambda_{Est}$, the error can be assumed to result from a difference between an instructed injection amount and an actual injection amount in the injector 11. Hereinafter, the calculation process of the learning correction coefficient performed by the learning correction coefficient calculating unit 91 using the error $\Delta\lambda$ will be described based on the flow of FIG. 7.

In Step S300, it is determined based on the engine speed Ne and the accelerator opening Q whether the engine 10 is in a lean operating state. If the engine 10 is in the lean operating state, the procedure proceeds to Step S310 in order to start the calculation of the learning correction coefficient.

In Step S310, a learning value $F_{CorrAdpt}$ is calculated by multiplying the error $\Delta\lambda$ obtained by subtracting the actual lambda value $\lambda_{Act}$ detected by the NOx/lambda sensor 45 from the estimated lambda value $\lambda_{Est}$ by a learning value gain $K_1$ and a correction sensitivity coefficient $K_2$ ($F_{CorrAdpt}=(\lambda_{Est}-\lambda_{Act})\times K_1 \times K_2$). The estimated lambda value $\lambda_{Est}$ is estimated and calculated from the operating state of the engine 10 depending on the engine speed Ne or the accelerator opening Q. The correction sensitivity coefficient $K_2$ is read from a correction sensitivity coefficient map 91A illustrated in FIG. 6 using the actual lambda value $\lambda_{Act}$ detected by the NOx/lambda sensor 45 as an input signal.

In Step S320, it is determined whether an absolute value $|F_{CorrAdpt}|$ of the learning value $F_{CorrAdpt}$ is in a range of a predetermined correction limit value A. In a case where the absolute value $|F_{CorrAdpt}|$ exceeds the correction limit value A, this control returns to stop the present learning.

In Step S330, it is determined whether a learning prohibition flag $F_{Pro}$ is turned off. The learning prohibition flag $F_{Pro}$ corresponds, for example, to the time of a transient operation of the engine 10, the time of the NOx purge control ($F_{NP}=1$), and the like. It is because in a state where such a condition is satisfied, the error $\Delta\lambda$ becomes larger according to the change of the actual lambda value $\lambda_{Act}$ so that the learning is not executed exactly. As for whether the engine 10 is in a transient operating state, for example, based on the time change amount of the actual lambda value $\lambda_{Act}$ detected by the NOx/lambda sensor 45, a case where the time change amount is larger than the predetermined threshold may be determined as the transient operating state.

In Step S340, a learning value map 91B (see FIG. 6) based on the engine speed Ne and the accelerator opening Q is renewed to the learning value $F_{CorrAdpt}$ calculated in Step S310. More specifically, a plurality of learning areas sectioned in response to the engine speed Ne and the accelerator opening Q are set on the learning value map 91B. Preferably, such learning areas are set such that the range thereof is narrower as the area is used more frequently, and the range thereof is wider as the area is used less frequently. Accordingly, in the frequently used area, a learning accuracy can be improved, and in the less-frequently used area, non-learning can be effectively prevented.

In Step S350, the learning correction coefficient $F_{Corr}$ is calculated by adding "1" to the learning value read from the learning value map 91B using the engine speed Ne and the accelerator opening Q as input signals ($F_{Corr}=1+F_{CorrAdpt}$). The learning correction coefficient $F_{Corr}$ is input to the injection amount correcting unit 92 illustrated in FIG. 6.

The injection amount correcting unit 92 executes the correction of the fuel injection amount by multiplying respective basic injection amounts of a pilot injection $Q_{Pilot}$, a pre-injection $Q_{Pre}$, a main injection $Q_{Main}$, an after injection $Q_{After}$, and a post injection $Q_{Post}$ by the learning correction coefficient $F_{Corr}$.

In this manner, a variation such as the aged deterioration, the property change, or the individual difference of the injectors 11 can be effectively excluded by correcting the fuel injection amount of the injector 11 with the learning value according to the error $\Delta\lambda$ between the estimated lambda value $\lambda_{Est}$ and the actual lambda value $\lambda_{Act}$.

<MAF Correction Coefficient>

The MAF correction coefficient calculating unit 95 calculates a MAF correction coefficient $Maf_{corr}$ used to set the MAF target value $MAF_{NPL\_Trgt}$ or the target injection amount $Q_{NPR\_Trgt}$ at the time of the NOx purge control.

In this embodiment, the fuel injection amount of the injector 11 is corrected based on the error $\Delta\lambda$ between the actual lambda value $\lambda_{Act}$ detected by the NOx/lambda sensor 45 and the estimated lambda value $\lambda_{Est}$. However, since the lambda is a ratio of air and fuel, a factor of the error $\Delta\lambda$ is not necessarily limited to the effect of the difference between the instructed injection amount and the actual injection amount in the injector 11. That is, the error $\Delta\lambda$ of the lambda may be affected by an error of the MAF sensor 40 as well as that of the injector 11.

Figure 8:
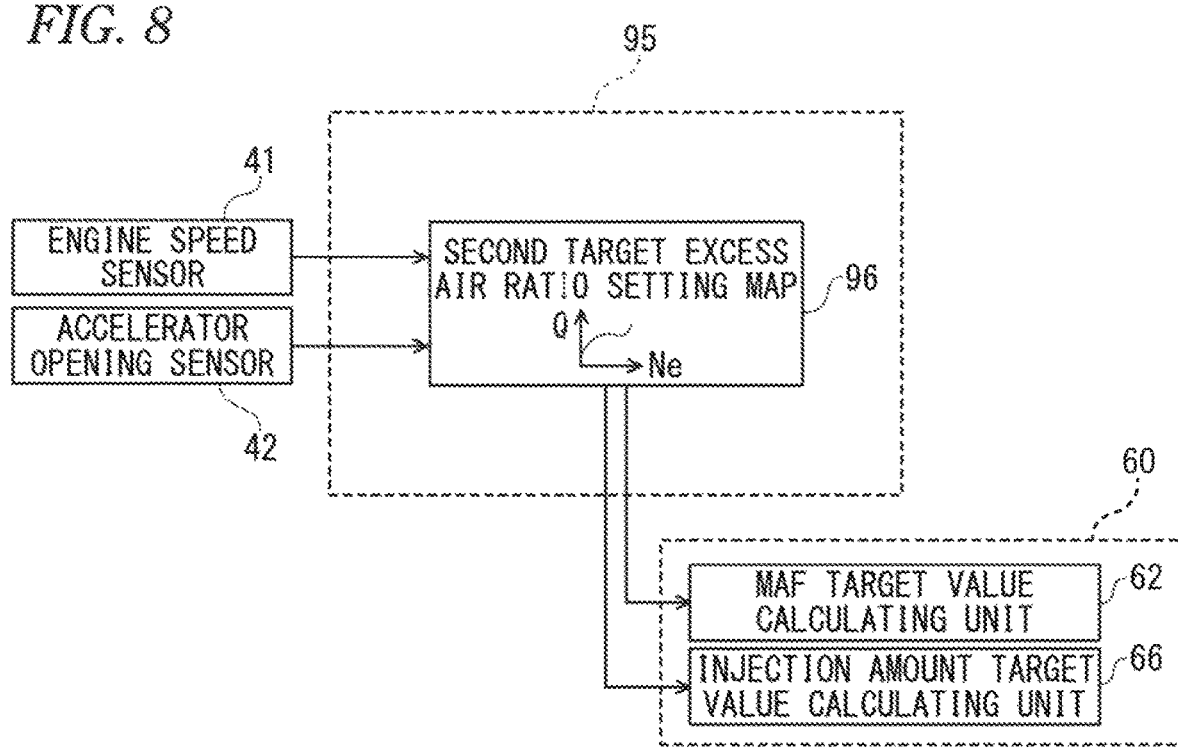
FIG. 8 is a block diagram illustrating a setting process of a MAF correction coefficient according to this embodiment.

FIG. 8 is a block diagram illustrating a setting process of the MAF correction coefficient $Maf_{corr}$ performed by the MAF correction coefficient calculating unit 95. A correction coefficient setting map 96 is a map based on the engine speed Ne and the accelerator opening Q, and the MAF correction coefficient $Maf_{corr}$ indicating the sensor property of the MAF sensor 40 corresponding to the engine speed Ne and the accelerator opening Q is set based on an experiment and the like in advance.

The MAF correction coefficient calculating unit 95 reads the MAF correction coefficient $Maf_{corr}$ from the correction coefficient setting map 96 using the engine speed Ne and the accelerator opening Q as input signals, and transmits the MAF correction coefficient $\text{Maf}_{\_corr}$ to the MAF target value calculating unit 62 and the injection amount target value calculating unit 66. Accordingly, the sensor property of the MAF sensor 40 can be effectively reflected to set the MAF target value $\text{MAF}_{NPL\_Trgt}$ or the target injection amount $Q_{NPR\_Trgt}$ at the time of the NOx purge control.

<Others>

The present invention is not limited to the above-described embodiment, and the invention may be modified appropriately without departing from the spirit and scope of the invention.

This application is based upon and claims the benefit of priority from Japanese Patent Application No. 2015-042668, filed Mar. 4, 2015, the entire contents of which are incorporated herein by reference.

INDUSTRIAL APPLICABILITY

The exhaust purification system and the catalyst regeneration method of the invention have an effect of effectively suppressing useless execution of NOx purge, thereby preventing deterioration of fuel consumption, and are useful in that the exhaust gas discharged from an internal combustion engine is effectively purified.

REFERENCE SIGNS LIST

10: engine
11: injector
12: intake passage
13: exhaust passage
16: intake throttle valve
24: EGR valve
31: oxidation catalyst
32: NOx occlusion reduction type catalyst
33: filter
34: exhaust pipe injection device
40: MAF sensor
45: NOx/lambda sensor
50: ECU

The invention claimed is:

1. An exhaust purification system comprising:
an NOx occlusion reduction catalyst that is provided in an exhaust passage of an internal combustion engine and, when an exhaust gas is in a lean state, occludes NOx contained in the exhaust gas and, when the exhaust gas is in a rich state, reduces and purifies the occluded NOx; and
a controller configured to:
execute a catalyst regeneration process of bringing the exhaust gas into the rich state to reduce and purify the NOx occluded in the NOx occlusion reduction catalyst;
estimate an NOx reduction amount before starting the catalyst regeneration process, the NOx reduction amount being an NOx amount which is predicted to be reduced by the NOx occlusion reduction catalyst at a time of executing the catalyst regeneration process; and
prohibit the execution of the catalyst regeneration process when the NOx reduction amount is less than a predetermined lower limit threshold,
wherein the controller is further configured to estimate the NOx reduction amount based on a preset and predetermined fixed value of an excess air ratio of the exhaust gas.

2. The exhaust purification system according to claim 1, wherein the controller is further configured to estimate the NOx reduction amount based on an exhaust air flow of the internal combustion engine, a temperature of the NOx occlusion reduction catalyst, and an NOx occlusion rate of the NOx occlusion reduction catalyst.

3. A catalyst regeneration method in an exhaust purification system including an NOx occlusion reduction catalyst that is disposed in an exhaust passage of an internal combustion engine, and occludes and reduce a nitrogen compound contained an exhaust gas discharged from the internal combustion engine, the method comprising:
a catalyst regeneration process of bringing the exhaust gas into a rich state to reduce and purify NOx occluded in the NOx occlusion reduction catalyst;
a reduction amount estimating process of estimating an NOx reduction amount before execution of the catalyst regeneration process, the NOx reduction amount being an NOx amount which is predicted to be reduced by the NOx occlusion reduction catalyst at a time of executing the catalyst regeneration process; and
a prohibition process of prohibiting the execution of the catalyst regeneration process when the NOx reduction amount estimated by the reduction amount estimating process is less than a lower limit threshold,
wherein the NOx reduction amount is estimated based on a preset and predetermined fixed value of an excess air ratio of the exhaust gas.

* * * * *